March 29, 1932. T. B. STILLMAN 1,851,465
BOILER
Filed May 11, 1928 6 Sheets-Sheet 1

INVENTOR
Thomas B. Stillman
BY
Gifford & Scull
ATTORNEYS

March 29, 1932.  T. B. STILLMAN  1,851,465
BOILER
Filed May 11, 1928   6 Sheets-Sheet 2

Fig. 9.

Patented Mar. 29, 1932

1,851,465

UNITED STATES PATENT OFFICE

THOMAS B. STILLMAN, OF SOUTH ORANGE, NEW JERSEY, ASSIGNOR TO THE BABCOCK & WILCOX COMPANY, OF BAYONNE, NEW JERSEY, A CORPORATION OF NEW JERSEY

BOILER

Application filed May 11, 1928. Serial No. 276,863.

This invention relates to a boiler, and more particularly one of the marine type, and resides in the improvement of various features which will be best understood from the following description.

In the accompanying drawings, I have shown selected embodiments of my invention, and referring thereto.

Figure 1:
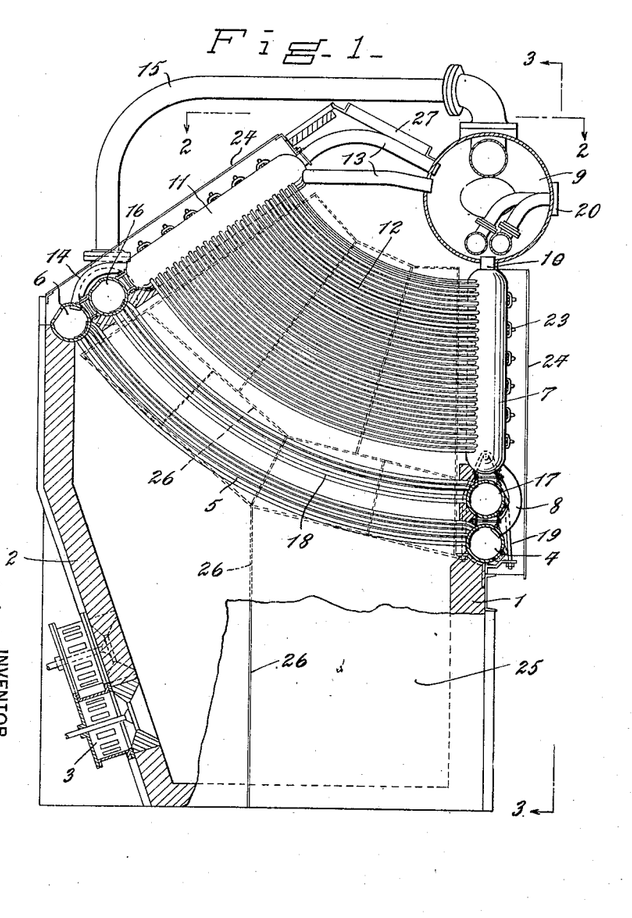
Fig. 1 is a transverse sectional view through a boiler setting showing one form which the invention may take, this view being taken on the line 1—1 of Fig. 3.
Figure 2:
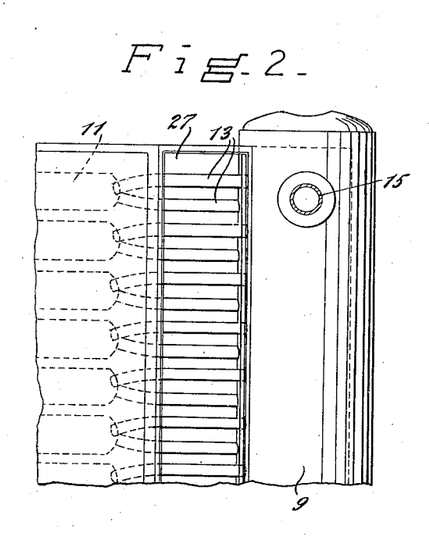
Fig. 2 is a view taken on the line 2—2 of Fig. 1.
Figure 3:
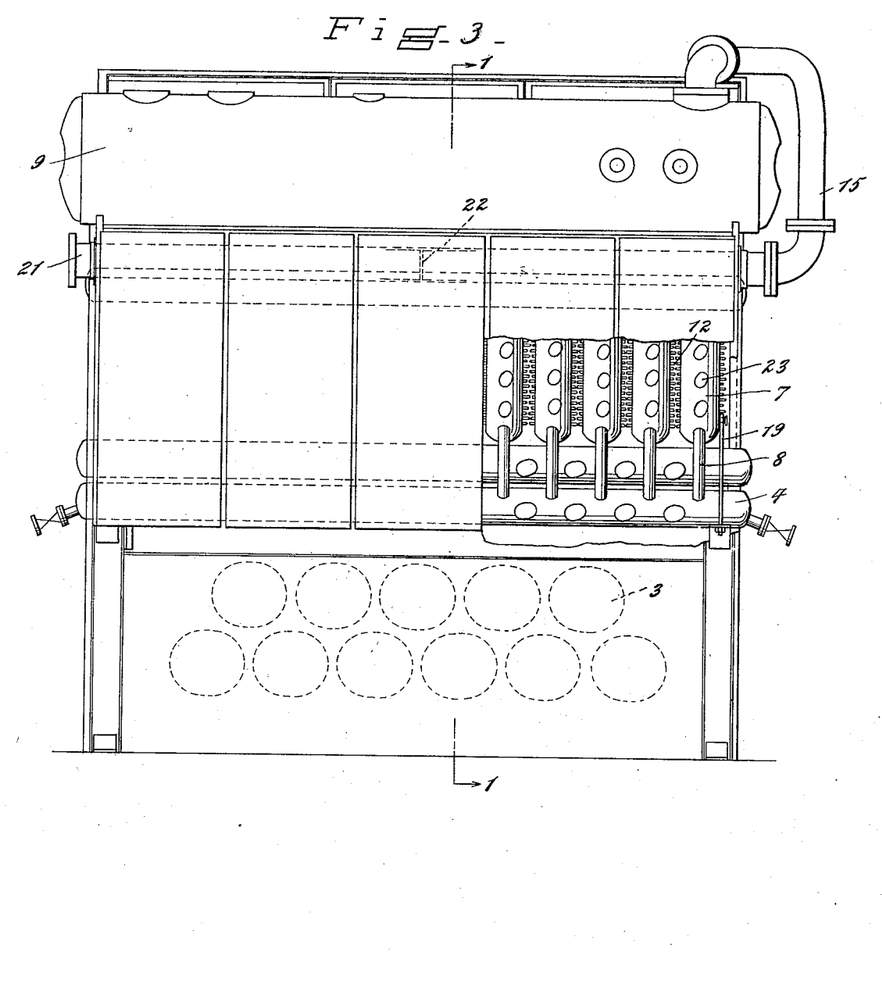
Fig. 3 is a front elevation of the boiler shown in Fig. 1, taken on the line 3—3 of Fig. 1, parts being broken away.

Referring first to Figs. 1, 2 and 3, I have shown therein a boiler setting having a front wall 1 substantially vertical, and the rear wall 2 with its lower portion inclined inwardly and having disposed therein a plurality of burners 3. These burners may be of any suitable type, as for burning oil or pulverized fuel.

Supported upon the front wall is a transversely extending water drum 4 which is connected by a plurality of tubes 5 to a drum 6 supported on the rear wall 2. These tubes 5 form a bank and are preferably curved on arcs of substantially concentric circles.

Disposed above the drum 4 is a plurality of vertically extending headers 7 connected to the drum 4 by nipples 8 and to a transverse steam and water drum 9 by means of nipples 10. Each of the vertical headers 7 forms part of one of a plurality of similar sections, the other parts of which comprise an inclined header 11 connected to the header 7 in the same section, by means of a nest of tubes 12 which are disposed substantially on arcs of concentric circles.

Preferably, each of the headers 7 and 11 in each section is cylindrical in form, and the tubes 12 are so arranged as to enter the headers substantially normal to the surfaces thereof. The axes of the two headers 7 and 11 in each section are disposed substantially in a common plane, and directed substantially toward the center of the concentric circles on which are disposed the tubes 12. The tubes 12 which fall substantially in the same plane as the axes of the headers, may be curved in only one plane, that is, the plane including these axes or one parallel thereto. The tubes in each section which are offset a substantial distance from the plane of the axes, will be curved or bent at their ends at an angle to that plane, so as to bring their ends more nearly normal to the surface of the headers which they enter. It is not essential that these ends be disposed perfectly normal to the surface of the header which they enter, but it is desirable that they approach that relation to the headers as nearly as possible without interfering with cleaning operations, as will be discussed later.

The upper end of each header 11 is connected to the drum 9 by nipples 13 which are disposed on opposite sides of the axis of the header, as plainly shown in Fig. 2, and are disposed one higher than the other, as shown in Fig. 1, to furnish proper ligament strength in the drum and so as to provide a staggered arrangement of nipples across the pass through which the hot gases leave the boiler. The lower end of each header 11 is connected to the drum 6 by means of nipples 14.

Leading from the steam space of the drum 9 is a pipe 15 which conveys steam to a transverse drum 16 forming part of a superheater, the other parts of which comprise a drum 17 and the tubes 18 which connect the drums 16 and 17 and form a bank of tubes disposed between the tubes 5 and 12. A suitable strap 19 is provided at each end of the boiler to hold the lower drum 17 of the superheater in position.

The drum 9 is provided with the usual feed water inlet 20, and the superheater is provided with the usual outlet 21. In this form, the upper drum 16 is arranged in two sections separated at 22, as shown in Fig. 3, whereby the steam will enter one section and pass through tubes 18 into the drum 17, back into the other section, and thence into the outlet 21.

As best shown in Figs. 2 and 3, the headers 7 and 11 are spaced apart and the space between two adjacent headers is sufficiently great to permit removal of a tube therefrom. In other words, this space is greater than the outside diameter of a tube. Each header is also provided with the usual handholes and handhole fittings designated at 23, and the spaces between the headers may be sealed by any suitable means such as that indicated in Fig. 5, in connection with another form of boiler, and which will be more fully described later. A casing 24 is disposed adjacent each set of headers, and each end of the boiler is closed by a casing 25. This casing 25 is preferably made in sections, the dividing lines between the sections being indicated at 26 in Fig. 1.

The structure so far described, provides a single pass boiler through which the hot gases from the burners 3 may pass upwardly over the tubes 12 and between nipples 13 through the flue 27. The pass tapers substantially uniformly throughout its length, and the arrangement of tubes is such as to provide for the maximum heating surface.

By spacing the headers as shown, and by arranging the handholes in the manner indicated, together with the tubes disposed on arcs of concentric circles, it is possible to remove any tube in any section with a minimum amount of labor.

As shown in Fig. 3, the tubes in adjoining sections overlap each other, and preferably the spacing of tubes in both directions is less than a tube diameter. This close spacing is feasible in this construction because it is possible to remove a tube by lengthwise movement thereof on the arc of its circle or, if found desirable, it is posible to cut the nipples connecting the headers to the various drums and bodily rotate an entire section to remove it, without disturbing the adjacent sections. This operation is made possible by the fact that, while the nest of tubes in each section may be wider than the width of the headers of that section, nevertheless the clear distance between alternate headers is at least as great as the overall width of the nest of tubes in a section. At the same time, any tube in a section may be reached for cleaning, by means of the handholes 23. The sections of the casing 25 are preferably arranged substantially as shown, so that ready access may be obtained to any portion of the boiler, without removing the entire casing.

Referring now to Figs. 4 to 8 inclusive, in which I have shown what I now consider my preferred form, I mount the lower transverse drum 4 upon the front wall 29 of the setting, in which wall are disposed the burners 30.

Figures 4, 6, 7:
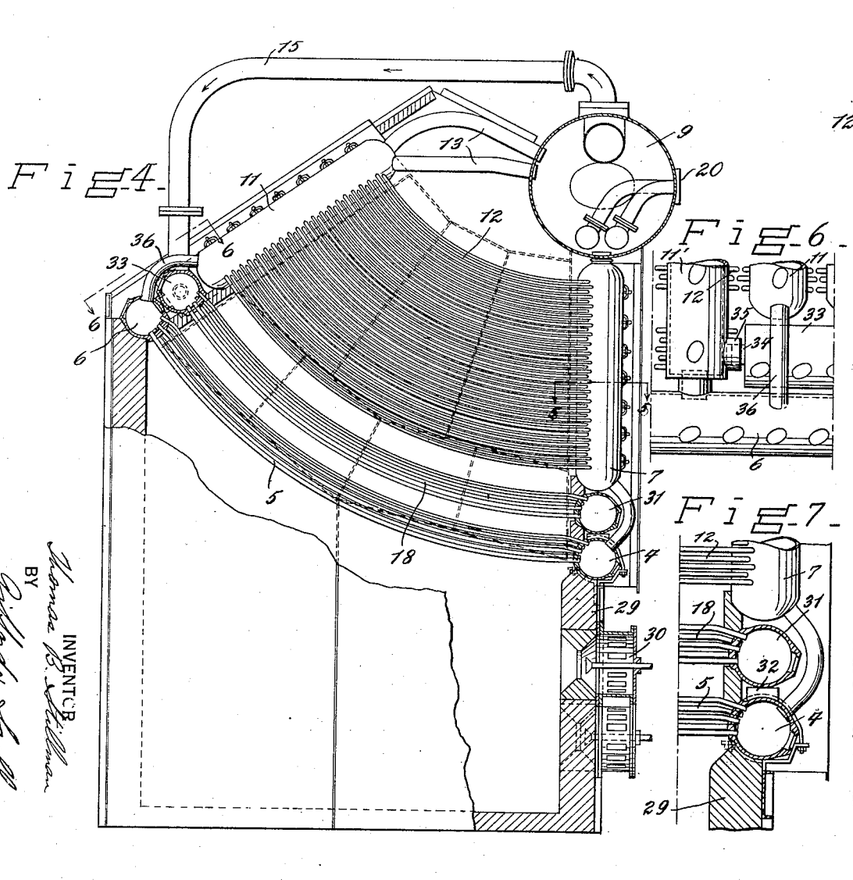
Fig. 4 is a view similar to Fig. 1, and showing what I now consider the preferred form of my invention, this view being taken on the line 4—4 of Fig. 8.
Fig. 6 is a fragmentary view taken on the line 6—6 of Fig. 4.
Fig. 7 is an enlarged detailed view showing the support for the lower superheater drum of Fig. 4.
Figure 8:
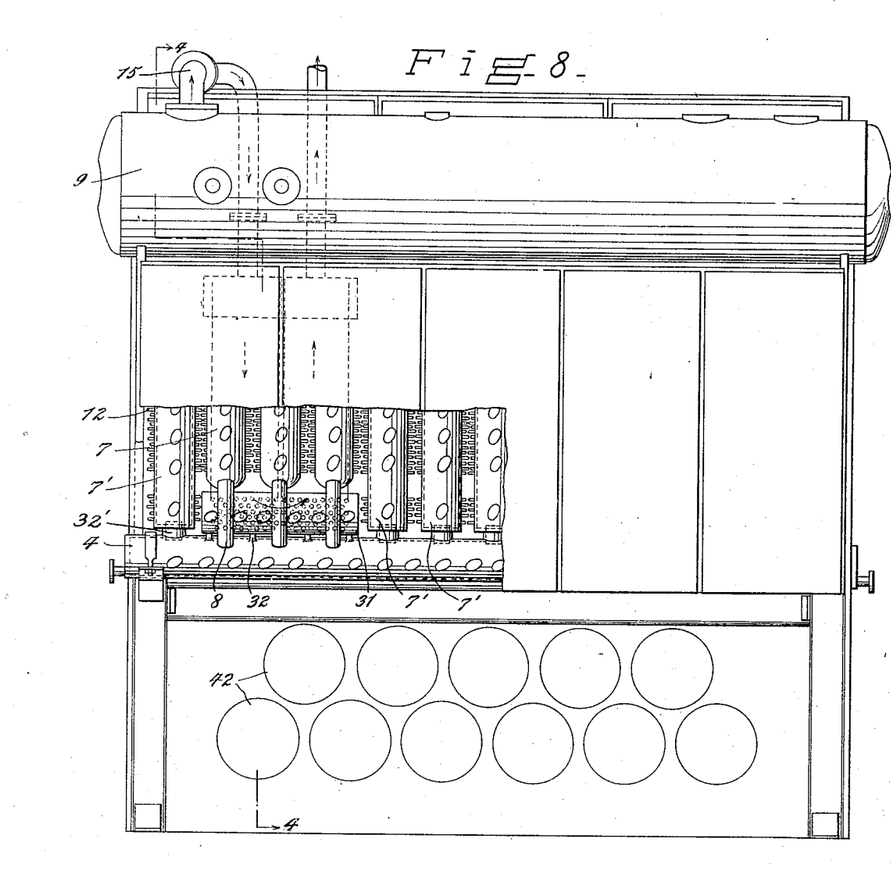
Fig. 8 is a view taken from the right of Fig. 4 and corresponding to Fig. 3.

In this form, the drums 4, 6 and 9 are arranged substantially in the same position as in the form first described. The tubes 12 are similarly arranged substantially on arcs of concentric circles, and extend between headers 7 and 11, as in the first described form. In this form, however, the superheater drums are made shorter than in the first embodiment, the lower drum 31 resting upon one or more bearings 32 which in this form are shown integral with the drum 4. The headers 7' at either end of the drum 31 extend substantially down to the drum 4 and are connected thereto by short nipples surrounded by collars 32' supporting the headers 7', as shown in Fig. 8. The headers 7 which are disposed above the superheater drum, are connected to the drum 4 by nipples 8, as in the first described form. The two headers 7' support the upper drum 9 above the superheater, and thus the drums 4 and 9 and headers 7', form a frame to support the intermediate headers 7.

The other drum 33 of the superheater, may be supported in the manner shown in Fig. 6, having one or both ends provided with a nose 34 received within a pocket 35 on the header 11'. It will be understood that the headers 11' at the opposite ends of the drum 33 extend down substantially to the drum 6 to which they may be connected by nipples surrounded by supporting collars, in the same manner as the headers 7' are connected to the drum 4, and the headers 11 are connected by nipples 36 to the drum 6. The two drums 31 and 33 are connected by the bank of tubes 18, and thus it will be seen that a construction is provided wherein one drum is fixed and the other drum may be moved lengthwise of the tubes.

Figure 5:
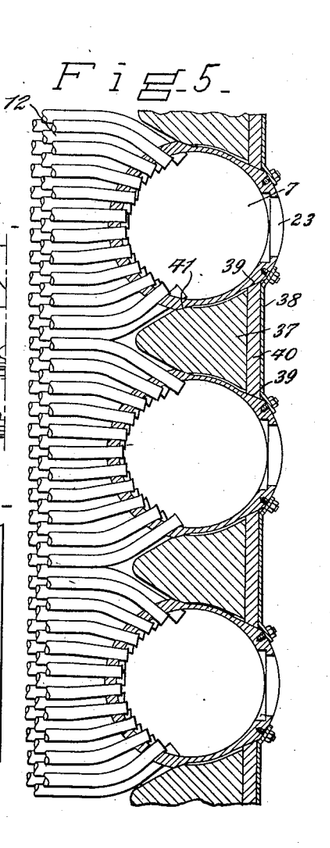
Fig. 5 is a fragmentary cross-section taken on the line 5—5 of Fig. 4.

The various sections are spaced apart such a distance that the clearance between adjacent headers is greater than a tube diameter, and the tubes in each section are so arranged that the tubes in any row will be substantially uniformly spaced across the bank of tubes transversely to the length of the headers, as best shown in Fig. 5.

The spacing of tubes is less than a tube diameter in both directions, transversely to the length of the headers, and also parallel thereto. The spaces between the headers, both the downtake and uptake, are filled with a suitable filling material 37 secured in place by plates 38 which may be bolted to the headers as shown in Fig. 5. Preferably, the headers are formed with shoulders 39 with which contacts the insulation 40, which is held in position by plates 38. The filling material also contacts with shoulders 41 disposed inwardly of the shoulders 39. It will be noted that this arrangement is one in which a rigid structure is provided, and in which the amount of heating surface is greatly increased. This increased heating surface is the result partly of the close spacing of the tubes, and this spacing is provided together with comparatively easy access to each tube, both for renewal and cleaning. All of the tubes may be cleaned by a suitable tool inserted through the handholes 23, and the tubes may be removed either through the handholes, or through the spaces between the headers. The tubes are expanded into the headers as nearly normal as can be, and at the same time permit insertion of a cleaning tool. It will be noted that substantially every tube has its end directed toward a handhole, so that the cleaning tool may be readily inserted into any tube. If a tube entered a header radially, or normal to the surface of the header, then it would be difficult to insert a tool thereinto, and for that reason I prefer to use the nonradial arrangement shown. This arrangement also makes possible a closer spacing of tubes with a header of given diameter than is possible where the tubes enter the header radially thereto. This closer spacing in turn makes possible an increased efficiency of boiler for a given space.

Another feature of importance in connection with this embodiment, is that the superheater need not be used at all times. For example, if the boiler is used in a vessel and the vessel is in port where no steam is required, the burners which are located beneath the superheater may be shut off, and only the burners at the other end of the boiler or those under the boiler tubes alone need be employed.

Figure 9:
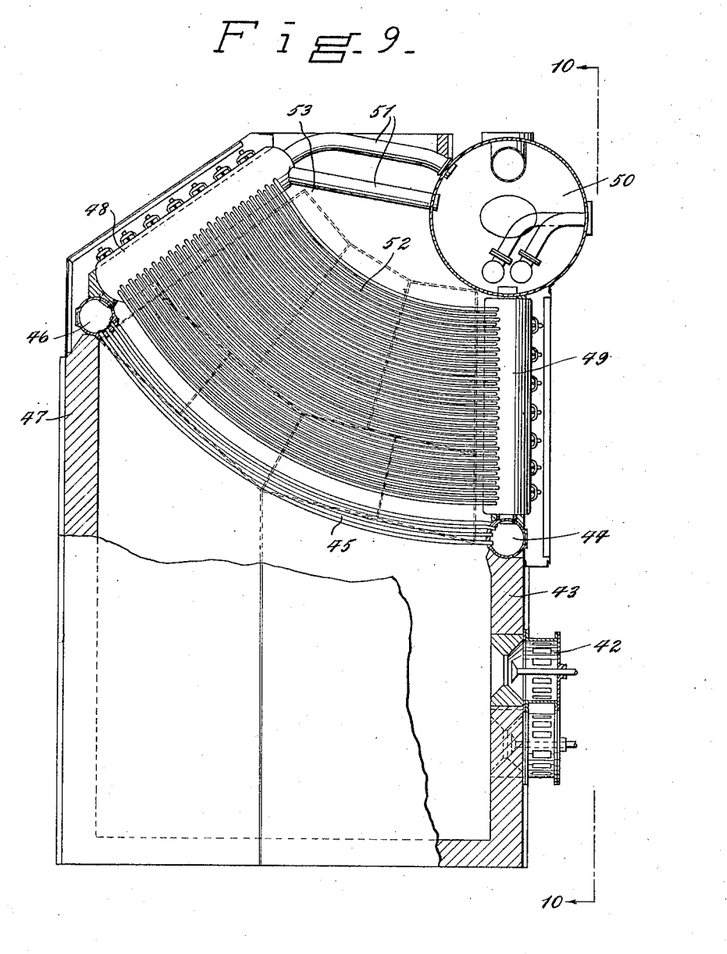
Fig. 9 is a view corresponding to Figs. 1 and 4, but showing a still further form which my invention may take, this view being taken on the line 9—9 of Fig. 10.
Figure 10:
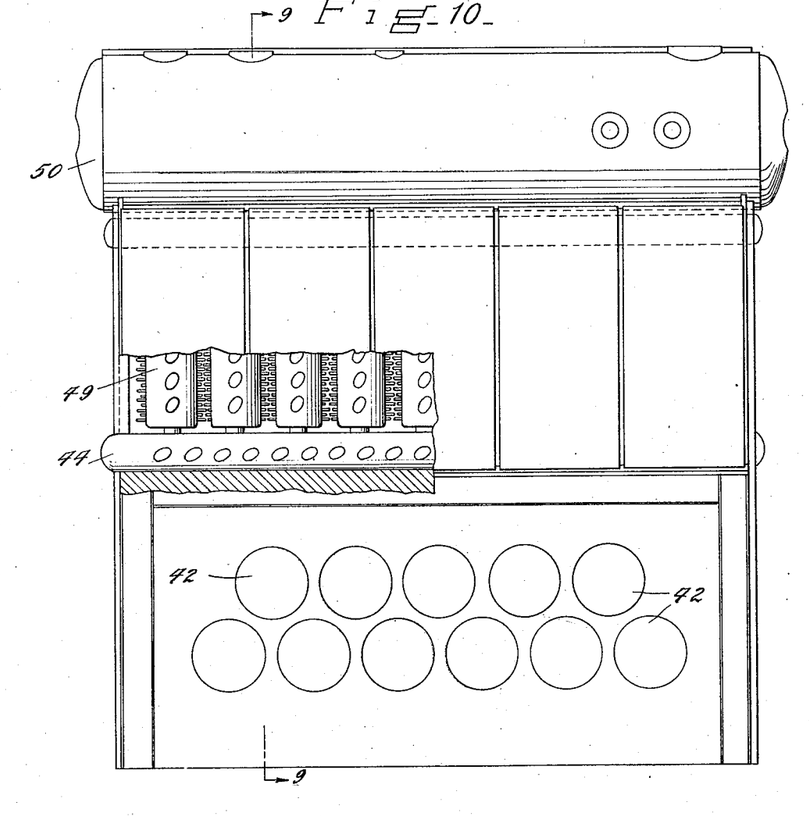
Fig. 10 is a view taken on the line 10—10 of Fig. 9, and corresponding to Figs. 3 and 8.

Referring now to Figs. 9 and 10. I have shown therein a modified form of boiler of the so called "saturated" type. That is to say, this type of boiler does not employ a superheater.

In this form, the burners 42 are mounted in the front wall 43, this wall supporting a transversely extending drum 44 which is connected by a bank of tubes 45 to an upper drum 46 supported on the rear wall 47. The uptake and downtake headers 48 and 49 respectively, are connected to the drums 46 and 44, by short nipples shown. The upper ends of the headers 49 are connected by short nipples directly to the steam and water drum 50, while the headers 48 are connected by circulators 51 to the steam drum. The headers are connected by a bank of tubes 52 which are arranged in substantially the same form as the tubes 12 previously described. Feed water is supplied at the inlet 20, as in the form shown in Figs. 1 and 4.

In this form, I have shown the upper ends of the tubes 52 as being straight for a short distance as viewed in Fig. 9. The ends of the curves on which the tubes are disposed, come approximately in the plane 53, and the tubes are continued tangent to those curves beyond this point as far as can be without making it impossible to remove a tube by movement on the arc of its circle. Of course it is understood that these portions of the tubes which appear straight in Fig. 9, are bent at an angle to the plane of Fig. 9, to enter the headers 48.

By the above arrangement of tubes, a somewhat greater heated surface can be obtained, without materially departing from the advantages obtained from the concentric arrangement of tubes. In substantially all other respects, this embodiment is similar to the one shown in Figs. 5 to 8 inclusive, except that it omits the superheater.

In all forms shown, it will be seen that there is provided a heat transfer device having a single pass across which there is arranged a bank of tubes having close uniform spacing, the spacing being less than a tube diameter. This arrangement is made possible by the curved tubes and by the spaced headers. The spaces between the headers and tubes adjacent their ends, is filled with the filling material 37, so as to prevent laning of gases between the headers. Similarly, laning through the bank is prevented by the uniform spacing of tubes.

I claim :—

1. In a boiler, an upper steam and water drum, downtake headers connected to said drum and spaced apart a distance greater than a tube diameter, a water drum disposed beneath said headers and connected thereto, a plurality of uptake headers each of which is connected by a plurality of tubes to a downtake header, the tubes being disposed substantially on arcs of concentric circles and the headers having handholes providing access to the tubes, connections between said uptake headers and said steam and water drum, a second water drum disposed adjacent the lower ends of said uptake headers and generally parallel to said first-named water drum, connections between said second water drum and said uptake headers, and a bank of tubes connecting said water drums.

2. In a boiler, an upper steam and water drum, downtake headers connected to said drum and spaced apart a distance greater than a tube diameter, a water drum disposed beneath said headers and connected thereto, a plurality of uptake headers each of which is connected by a bank of tubes to a downtake header, the tubes being disposed substantially on arcs of concentric circles and the headers having handholes providing access to the tubes, connections between said uptake headers and said steam and water drum, a second water drum disposed adjacent the lower ends of said uptake headers and generally parallel to said first-named water drum, connections between said second water drum and said uptake headers, a bank of tubes connecting said water drums, and a superheater comprising a bank of tubes disposed between the tubes of said other banks and drums disposed beneath said headers.

3. In a boiler, a steam and water drum, a plurality of sections comprising uptake and downtake headers connected by tubes, means connecting said downtake headers to said drum, a plurality of circulators connecting the upper end of each uptake header to the drum, said circulators being disposed on opposite sides of the axis of the header and being spaced apart vertically.

4. In a boiler, a horizontally extending water drum, means supporting said drum, a pair of vertically extending headers having their lower ends supported on said drum and spaced apart, an upper steam and water drum supported on the upper ends of said headers, a superheater header disposed above said water drum and between said headers, one or more vertically extending headers supported by said steam and water drum and having their lower ends disposed above the superheater, and means connecting the lower ends of said headers to said water drum.

5. In a boiler having a single pass through which hot gases are adapted to flow, spaced banks of tubes disposed substantially on arcs of concentric circles and so arranged that the flow of gases is substantially toward the center of said circles, a bank of superheater tubes disposed between said spaced banks and parallel to the tubes therein, and means connecting all of said tubes to the circulating system of the boiler.

6. In a boiler, a horizontally extending water drum, means supporting said drum, a pair of vertically extending headers having their lower ends supported on said drum and spaced apart, an upper steam and water drum supported on the upper ends of said headers, a superheater header disposed above said water drum and between said headers, one or more vertically extending headers supported by said steam and water drum and having their lower ends disposed above the superheater, means connecting the lower ends of said headers to said water drum, and means rigidly securing said headers together.

7. In a heat transfer device, a pass for hot gases, a header disposed adjacent one side of said pass, a drum disposed substantially at right angles to said header, a nose formed on the end of said drum on the outside thereof, and means forming a pocket on the outside of said header and receiving said nose.

8. In a heat transfer device, a pass for hot gases, uptake and downtake headers disposed on opposite sides of said pass substantially parallel to the direction of flow of gases therethrough, tubes extending across said pass and connecting said headers, drums disposed substantially at right angles to said headers and at one end thereof, said drums being placed at opposite sides of the pass and connected by tubes extending thereacross, means slidably supporting one of said drums to permit movement thereof, two headers adjacent the other drum being extended past the ends thereof, projections on the ends of said drum, and pockets in said extended headers to receive said projections.

9. In a heat transfer device, a pass for hot gases, a plurality of headers forming part of one side of said pass with the axes of said headers disposed substantially in the same plane, tubes extending inwardly from said headers across said pass and connected to other headers on the opposite side of the pass, a drum disposed with its axis substantially in the same plane as the axes of said headers but at right angles thereto and across the ends of certain of said tubes, with the ends of said drum disposed adjacent to certain of said headers, said last named headers extending across the ends of said drum and means on said last named headers forming supports for the ends of said drum.

10. In a boiler, a steam and water drum, a row of downtake headers disposed beneath and connected to said drum and extending downwardly therefrom, a row of uptake headers disposed at an angle to the row of downtake headers and forming therewith a single gas pass narrowing in the direction of flow of said gases, the uptake headers each having one end thereof higher than the other, connections from said higher ends of the uptake headers to said drum, said headers being spaced apart in their rows, and a bank of tubes extending across said pass and connecting the uptake and downtake headers and substantially uniformly spaced apart transversely of the lengths of the headers, said tubes for substantially their entire lengths being disposed in planes substantially normal to said rows and at least some of said tubes being bent adjacent their ends in a direction transverse to said planes to enter holes in said headers.

11. In a boiler, a steam and water drum, a row of downtake headers disposed beneath and connected to said drum and extending downwardly therefrom, a row of uptake headers disposed at an angle to the row of downtake headers and forming therewith a single gas pass narrowing in the direction of flow of said gases, the uptake headers each having one end thereof higher than the other, connections from said higher ends of the uptake headers to said drum, said headers being spaced apart in their rows, and a bank of tubes extending across said pass and connecting the uptake and downtake headers and substantially uniformly spaced apart transversely of the lengths of the headers, said tubes for substantially their entire lengths being disposed in planes substantially normal to said rows and at least some of said tubes being bent adjacent their ends in a direction transverse to said planes to enter holes in said headers and said headers having circumferentially curved surfaces to receive said bent ends.

12. In a boiler, a steam and water drum, a row of downtake headers disposed beneath and connected to said drum and extending downwardly therefrom, a row of uptake headers disposed at an angle to the row of downtake headers and forming therewith a single gas pass narrowing in the direction of flow of said gases, the uptake headers each having one end thereof higher than the other, connections from said higher ends of the uptake headers to said drum, said headers being spaced apart in their rows, and a bank of tubes extending across said pass and connecting the uptake and downtake headers and substantially uniformly spaced apart a distance less than a tube diameter transversely of the lengths of the headers, said tubes for substantially their entire lengths being disposed in planes substantially normal to said rows and at least some of said tubes being bent adjacent their ends in a direction transverse to said planes to enter holes in said headers.

13. In a boiler, a steam and water drum, a row of downtake headers disposed beneath and connected to said drum and extending downwardly therefrom, a row of uptake headers disposed at an angle to the row of downtake headers and forming therewith a single gas pass narrowing in the direction of flow of said gases, the uptake headers each having one end thereof higher than the other, connections from said higher ends of the uptake headers to said drum, said headers being spaced apart in their rows, and a bank of tubes extending across said pass and connecting the uptake and downtake headers and substantially uniformly spaced apart transversely of the lengths of the headers, said tubes for substantially their entire lengths being disposed in planes substantially normal to said rows and being bent in said planes and at least some of said tubes being bent adjacent their ends in a direction transverse to said planes to enter holes in said headers.

14. In a boiler, a steam and water drum, a row of downtake headers disposed beneath and connected to said drum and extending downwardly therefrom, a row of uptake headers disposed at an angle to the row of downtake headers and forming therewith a single gas pass narrowing in the direction of flow of said gases, the uptake headers each having one end thereof higher than the other, connections from said higher ends of the uptake headers to said drum, said headers being spaced apart in their rows, and a bank of tubes extending across said pass and connecting the uptake and downtake headers and substantially uniformly spaced apart a distance less than a tube diameter transversely of the lengths of the headers, said tubes for substantially their entire lengths being disposed in planes substantially normal to said rows and being bent in said planes and at least some of said tubes being bent adjacent their ends in a direction transverse to said planes to enter holes in said headers.

15. In a boiler, a steam and water drum, a row of downtake headers disposed beneath and connected to said drum and extending downwardly therefrom, a row of uptake headers disposed at an angle to the row of downtake headers and forming therewith a single gas pass narrowing in the direction of flow of said gases, said headers being cylindrical in cross section and spaced apart in their rows a distance greater than a tube diameter, the uptake headers each having one end thereof higher than the other, connections from said higher ends of the uptake headers to said drum and extending across the narrow end of said pass, and a bank of tubes extending across said pass and connecting the uptake and downtake headers and substantially uniformly spaced apart a distance less than a tube diameter transversely of the lengths of the headers, said tubes for substantially their entire lengths being disposed in planes substantially normal to said rows and being bent in said planes and at least some of said tubes being bent adjacent their ends in a direction transverse to said planes to enter holes in the cylindrical walls of said headers.

16. In a boiler, a steam and water drum, a row of downtake headers and a row of uptake headers connected to said drum, said headers being spaced apart in their rows, a bank of tubes extending between said rows and connecting the uptake and downtake headers and substantially uniformly spaced apart transversely of the length of the headers, said tubes for substantially their entire lengths being disposed in planes substantially normal to said rows and at least some of said tubes being bent adjacent their ends in a direction transverse to said planes to enter holes in said headers, means closing the spaces between said headers to prevent escape of gases therebetween, and means extending inwardly between said headers and between said bent ends of said tubes to prevent laning of gases in a direction parallel to the lengths of the headers.

THOMAS B. STILLMAN.